United States Patent Office 2,762,110
Patented Sept. 11, 1956

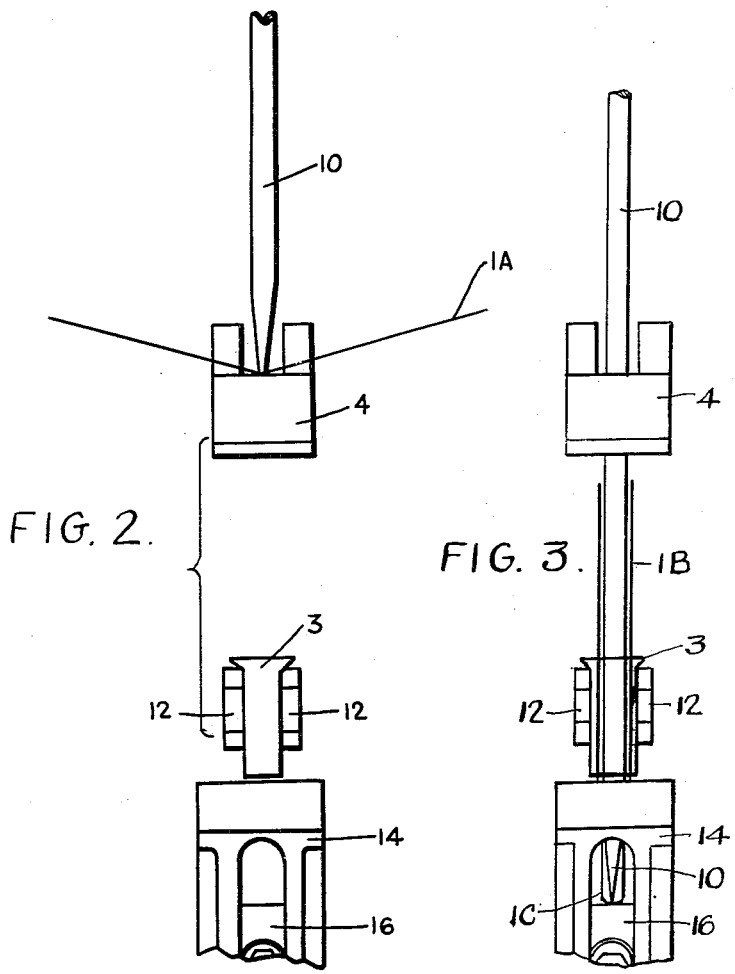

2,762,110

LEAD-WIRE FEEDING METHOD

Lawson J. Ward, Danvers, Mass., assignor to Sylvania Electric Products Inc., Salem, Mass., a corporation of Massachusetts Application June 3, 1954, Serial No. 434,146

2 Claims. (Cl. 29—25.11)

This invention relates to the manufacture of sealed electrical devices, such as lamps, radio tubes and the like, which are provided with lead-wires for the establishment of electrical connections from outside the sealed devices to one or more elements inside the devices. More particularly, this invention relates to the manufacture of the stems of sealed electrical devices and to a method of feeding lead-wires during this manufacturing operation.

In the manufacture of stems for electric lamps, for example, flares, lead-wires and exhaust tubes are usually fed to the heads of the stem machine at certain stations thereon and then carried through a plurality of operating stations where the lead-wires and the exhaust tubes are sealed to the flares. Feeding of the lead-wires to the heads of the stem machine is usually accomplished by a finger which selects a lead-wire from a supply thereof and deposits it in a chute which directs the wire to a head of the machine. A specific example of a lead-wire feeding device is shown and described in U. S. Patent Number 2,637,144, issued May 5, 1953.

Although lead-wire feeding devices of this type have usually been considered satisfactory for many applications, the time consumed in the selection of one lead-wire from a supply thereof and effectuation of its transfer to a head of the stem machine properly positioned thereon, is a substantial factor in the determination of the maximum speed at which the stem machine can be operated satisfactorily. Another limitation encountered in the use of a lead-wire feeding device of this type is the diameter of the flare. Since the lead-wires and the exhaust tube must be positioned accurately both with respect to one another and with respect to the flare within which they are disposed for the stem manufacturing operations, this orientation becomes more difficult as the diameter of the flare decreases. Thus high speed operation with flares of very small diameter presents a very substantial problem in so far as lead-wire feeding is concerned.

Accordingly, therefore, an object of this invention is to develop a new method of providing a stem machine head with lead-wires properly disposed for the stem fabricating operations.

Another object is to develop a new method of providing a stem machine head with lead-wires which will permit operation of the stem machine at high speeds.

A further object is to develop a new method of providing a stem machine head with lead-wires which will permit satisfactory use thereof with flares of small diameter.

A further object is to develop a new method of providng a stem machine head with lead-wires which will permit satisfactory use thereof with flares of small diameter and at the same time permit the stem machine to be operated at high speeds.

These and other objects, advantages and features are attained, in accordance with the principles of this invention, by positioning a wire, approximately equal in length to the length of two lead-wires, above a head of a stem machine with the longitudinal center thereof in register therewith and in register with a flare positioned on the stem machine head. This length of wire is then bent at its longitudinal center and pushed downwardly into and partially through the flare so that it assumes a hairpin-like configuration with the hook end of the hairpin lying below the flare and within the weld block of the head of the stem machine, and the free ends of the hairpin extending upwardly from the mouth of the flare. After the conventional stem manufacturing operations have been completed and the hairpin has been sealed in the flare, the hook end thereof is severed therefrom to thereby provide two separate lead-wires sealed in the flare and ready for example, for the mounting thereon of a filament in the case of incandescent or photoflash lamp manufacture; or alternatively, the hook end of the hairpin may be severed after the filament has been mounted.

A specific embodiment of the method of this invention is described below in conjunction with the accompanying drawings in which:

Figure 2 is a fragmentary elevational view showing the anvil in register with a flare held by a pair of jaws of the stem machine head, the flare in register with the weld block of the stem machine head, and the punch shortly after it has moved into engagement with the wire and started to push it through the anvil.

Figure 3 is a fragmentary elevational view showing the punch at the end of its stroke, the hook end of the hairpin being disposed within the weld block of the stem machine head and the free ends of the hairpin extending upwardly from the mouth of the flare.

Figure 1:
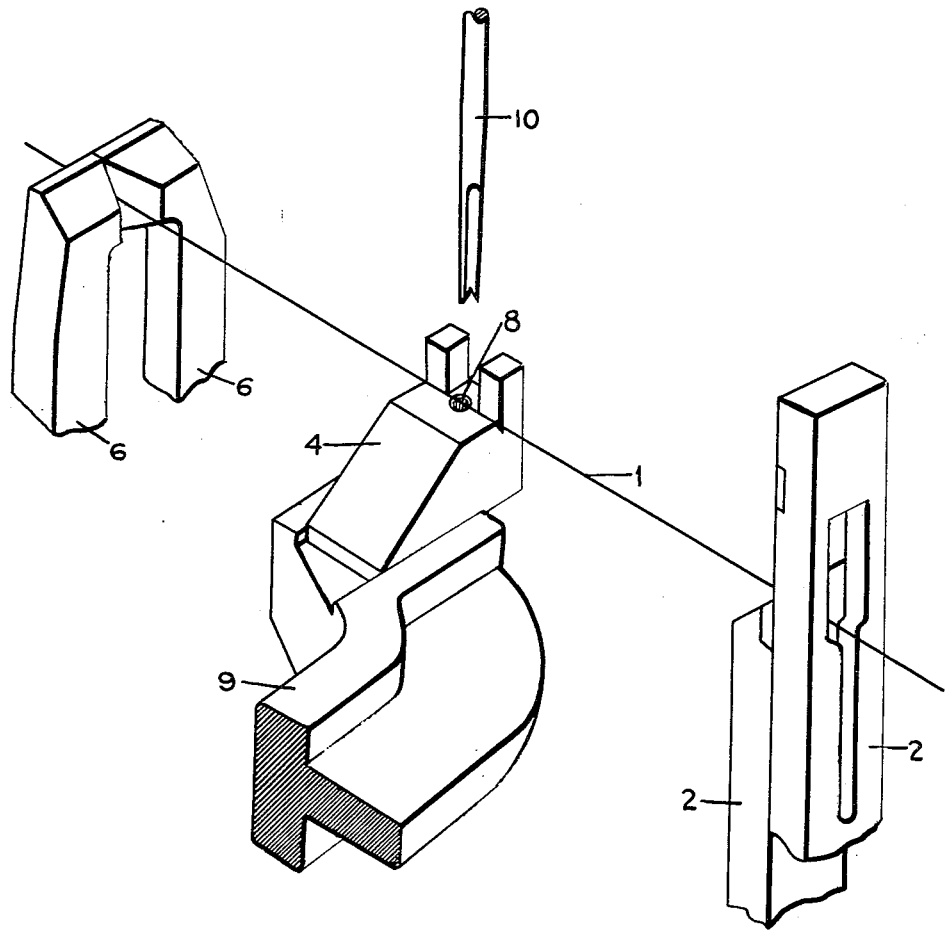
Figure 1 is a fragmentary perspective view showing a length of wire extending through a cutter, across an anvil and gripped at its free end by a pair of jaws, a punch being disposed above and in register with a hole extending through the anvil across which the wire extends.

In the specific embodiment of the method of this invention illustrated in the accompanying drawings, wire 1, of a type suitable for sealing to glass, such as dumet wire for example, is advanced from a supply thereof (not shown) such as a spool, through a pair of cutting members 2, across an anvil 4 and into wire-gripping jaws 6. The anvil 4, which is mounted on a base 9, is provided with a hole 8 which extends therethrough. A punch 10 is disposed above and in register with hole 8 in anvil 4 across which wire 1 extends. After a pre-determined length of wire 1 has been advanced across anvil 4 as shown in Figure 1, the jaws 6 are actuated to effect a gripping of the free end of the wire 1. The punch 10 is then moved downwardly into engagement with the wire 1. With the wire 1 now held at two points, viz., by the jaws 6 and the punch 10, cutters 2 are actuated to sever from the supply of wire that portion thereof which extends between the cutters 2 and the gripping jaws 6. This length of wire, hereinafter identified as wire 1*a*, is approximately equal in length to the desired length of two lead-wires. The jaws 6 are then actuated to release their grip on the wire 1*a*, the punch 10 holding the wire in position on the anvil 4.

Referring now to Figure 2, the anvil 4 with the wire 1*a* thereon and the punch 10 are moved to a position above and in register with a flare 3 held by jaws 12 of a stem machine head immediately above and in register with the weld block 14 of the stem machine head. The punch 10 is then moved downwardly to push the wire 1*a* through the hole 8 in anvil 4 (Fig. 3) and into the flare 3. At the end of the downward stroke of the punch 10, as is shown in Figure 3, the wire 1*a* has been shaped to the configuration of a hairpin 1*b*, the loop end 1*c* thereof resting on a stop 16 in weld block 14, and the main body thereof, due to its springiness, bearing against the inside wall of flare 3 with sufficient force to make it self-supporting therein. The punch 10 is then retracted and the punch and the anvil 4 are returned to their Figure 1 position, ready for the start of another operating cycle.

With the hairpin 1b disposed as just described on a head of the stem machine, conventional stem manufacturing operations are then performed thereon, such as those described in U. S. Patent 2,637,144 entitled "Automatic Lamp Stem Fabricating Apparatus," for example. These operations usually include the addition of an exhaust tube to the wire-flare assembly in the stem machine head, heating of the lower end of the flare to a molten state, and shaping of the molten glass to effect a sealing of the wire therein.

After the stem has been fabricated it is ready for the mounting thereon of a filament, in the manner taught in U. S. Patent 2,640,509 for example. The filament may be mounted either before or after the loop end 1c of the hairpin 1b has been clipped off to define a pair of lead-wires which support the filament. Clipping off of the loop end 1c of the hairpin 1b may be effected in any suitable manner, such as by a cutting mechanism located at one of the stations on the machine for example.

The specific embodiment of this invention illustrated in the accompanying drawings and described above represents but one of a number of embodiments and modifications which, from the foregoing, will be apparent to one skilled in the art. For example, the anvil may be provided with a channel or slot through which the wire is pushed by the punch, rather than a hole as shown in the drawings; in which case the flare itself would serve in part at least as a forming device for shaping the hairpin. To facilitate the feeding and hairpin forming operations, formation of the hairpin may be started immediately after the pre-determined length of wire has been cut from the supply thereof and released by the gripping jaws, and continued during transfer to a position above and in register with a stem machine head.

What I claim is:

1. In the manufacture of stems for electric lamps and the like from a plurality of components including a flare, the method of providing the stem with a pair of lead-wires, said method comprising: positioning a wire approximately equal in length to the length of two lead wires above the flare; bending said wire into substantially U-shaped configuration and moving it down into the flare until the loop portion of said wire lies below the flare; heating the flare to effect a sealing of the substantially U-shaped wire thereto; and clipping off the loop portion of the U-shaped wire to thereby provide two separate wires sealed in said flare.

2. In the manufacture of stems for electric lamps and the like from a plurality of components including a flare, the method of providing the stem with a pair of lead-wires, said method comprising: positioning a wire above the flare; bending the wire into substantially U-shaped configuration and moving it down into the flare until the loop portion of said wire lies below the flare; heating the flare to effect a sealing of the substantially U-shaped wire thereto; and clipping off the loop portion of the U-shaped wire to thereby provide two separate wires sealed in said flare.

References Cited in the file of this patent

UNITED STATES PATENTS

| | | |
|---|---|---|
| 386,099 | Wightman et al. | July 10, 1888 |
| 1,920,630 | Conn | Aug. 1, 1933 |